United States Patent

Gan et al.

[11] Patent Number: 6,063,526
[45] Date of Patent: May 16, 2000

[54] DICARBONATE ADDITIVES FOR NONAQUEOUS ELECTROLYTE IN ALKALI METAL ELECTROCHEMICAL CELLS

[75] Inventors: Hong Gan; Esther S. Takuchi, both of East Amherst, N.Y.

[73] Assignee: Wilson Greatbatch Ltd., Clarence, N.Y.

[21] Appl. No.: 09/061,582

[22] Filed: Apr. 16, 1998

[51] Int. Cl.[7] .................................................. H01M 6/16
[52] U.S. Cl. ............... 429/326; 429/231.9; 429/231.95; 429/325; 429/328; 429/329; 429/330; 429/332; 429/333; 429/334; 429/335
[58] Field of Search ..................... 429/231.9, 231.95, 429/231.2, 325, 326, 329, 328, 330, 332, 333, 334, 335

[56] References Cited

U.S. PATENT DOCUMENTS

| | | | |
|---|---|---|---|
| 4,929,748 | 5/1990 | Franklin | 558/276 |
| 5,346,787 | 9/1994 | Chaloner-Gill | 429/192 |
| 5,427,874 | 6/1995 | Sugeno | 429/194 |
| 5,498,495 | 3/1996 | Takada et al. | 429/219 |
| 5,523,481 | 6/1996 | Pies et al. | 562/894 |
| 5,545,497 | 8/1996 | Takeuchi et al. | 429/219 |
| 5,639,577 | 6/1997 | Takeuchi et al. | 429/219 |
| 5,670,276 | 9/1997 | Takeuchi et al. | 429/219 |
| 5,753,389 | 5/1998 | Gan et al. | 429/197 |
| 5,830,600 | 11/1998 | Narang et al. | 429/192 |

FOREIGN PATENT DOCUMENTS

| | | | |
|---|---|---|---|
| 7-211350 | 8/1995 | Japan | H01M 10/40 |
| 9-245831 | 9/1997 | Japan | H01M 10/40 |

*Primary Examiner*—Maria Nuzzolillo
*Assistant Examiner*—J. O'Malley
*Attorney, Agent, or Firm*—Hodgson Russ Andrews, Woods & Goodyear LLP

[57] ABSTRACT

An alkali metal, solid cathode, nonaqueous electrochemical cell capable of delivering high current pulses, rapidly recovering its open circuit voltage and having high current capacity, is described. The stated benefits are realized by the addition of at least one dicarbonate additive to an electrolyte comprising an alkali metal salt dissolved in a mixture of a low viscosity solvent and a high permittivity solvent. A preferred solvent mixture includes propylene carbonate, dimethoxyethane and an alkyl dicarbonate additive.

44 Claims, 4 Drawing Sheets

DICARBONATE ADDITIVES FOR NONAQUEOUS ELECTROLYTE IN ALKALI METAL ELECTROCHEMICAL CELLS

BACKGROUND OF INVENTION

1. Field of the Invention

The present invention generally relates to an alkali metal electrochemical cell, and more particularly, to an alkali metal cell suitable for current pulse discharge applications with reduced or no appreciable voltage delay. Still more particularly, the present invention relates to a lithium electrochemical cell activated with an electrolyte having an additive for the purpose of reducing and/or eliminating voltage delay under current pulse discharge applications. Voltage delay is a phenomenon typically exhibited in an alkali metal/transition metal oxide cell, and particularly, a lithium/silver vanadium oxide cell, that has been depleted of 40% to 70% of its capacity and is subjected to current pulse discharge applications. According to the present invention, the preferred additive to the activating electrolyte for such a chemistry is a dicarbonate compound.

Figure 1:
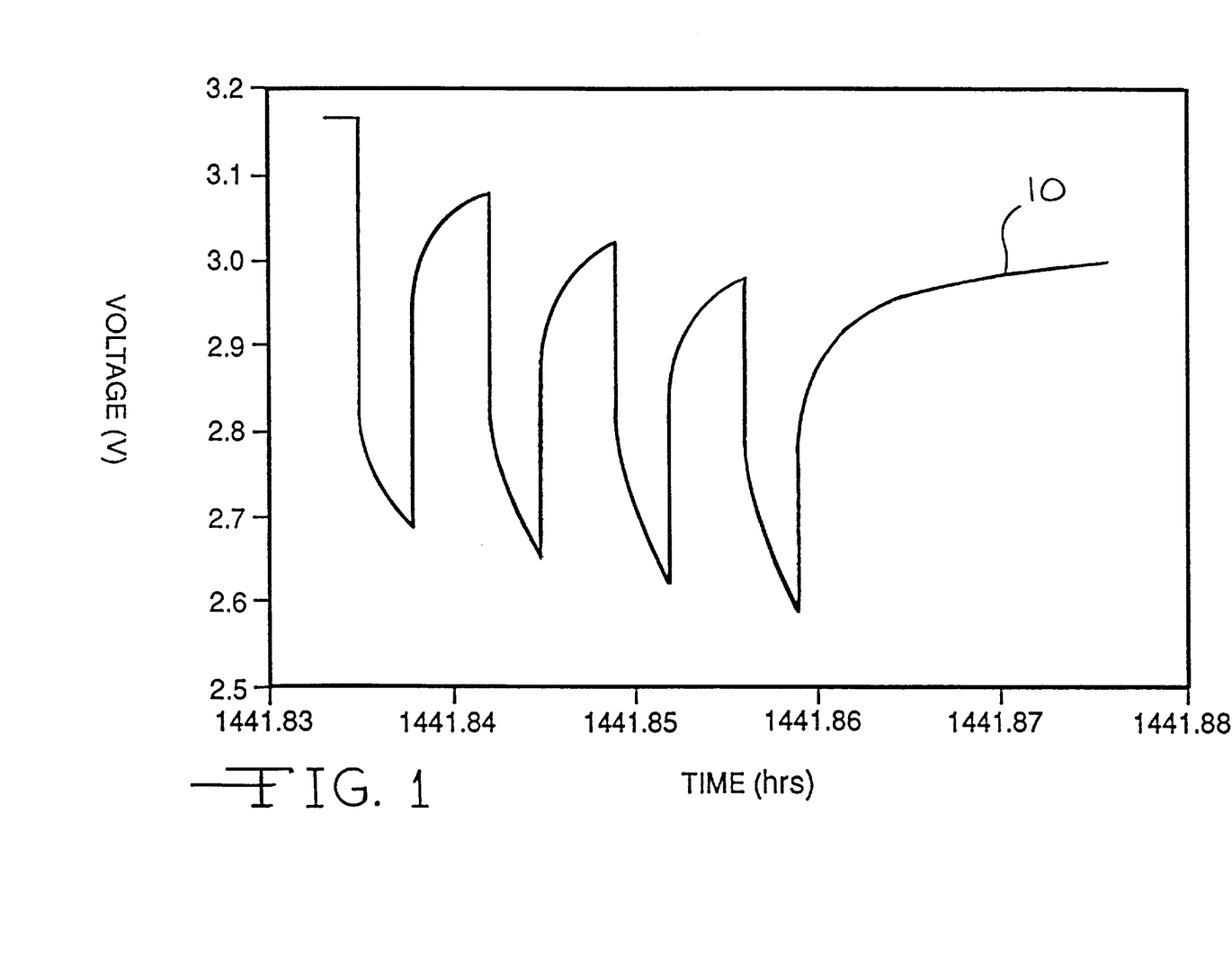
FIG. 1 is a graph showing an illustrative pulse discharge curve 10 of an exemplary electrochemical cell that does not exhibit voltage delay.

The voltage response of a cell which does not exhibit voltage delay during the application of a short duration pulse or pulse train has distinct features. First, the cell potential decreases throughout the application of the pulse until it reaches a minimum at the end of the pulse, and second, the minimum potential of the first pulse in a series of pulses is higher than the minimum potential of the last pulse. FIG. 1 is a graph showing an illustrative discharge curve 10 as a typical or "ideal" response of a cell during the application of a series of pulses as a pulse train that does not exhibit voltage delay.

Figure 2:
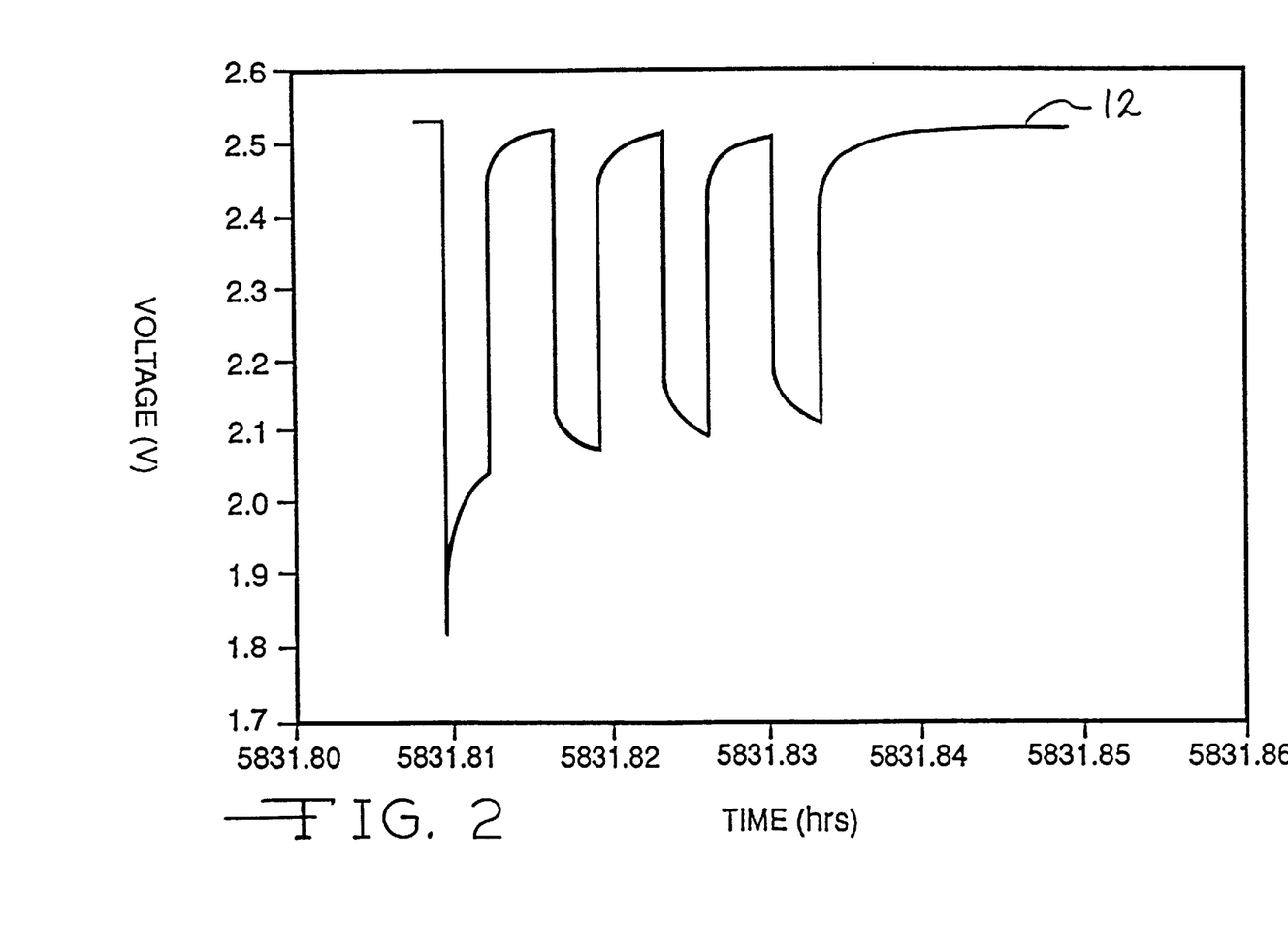
FIG. 2 is a graph showing an illustrative pulse discharge curve 12 of an exemplary electrochemical cell that exhibits voltage delay.

On the other hand, the voltage response of a cell which exhibits voltage delay during the application of a short duration pulse or during a pulse train can take one or both of two forms. One form is that the leading edge potential of the first pulse is lower than the end edge potential of the first pulse. In other words, the voltage of the cell at the instant the first pulse is applied is lower than the voltage of the cell immediately before the first pulse is removed. The second form of voltage delay is that the minimum potential of the first pulse is lower than the minimum potential of the last pulse when a series of pulses have been applied. FIG. 2 is a graph showing an illustrative discharge curve 12 as the voltage response of a cell that exhibits both forms of voltage delay.

The initial drop in cell potential during the application of a short duration pulse reflects the resistance of the cell, i.e., the resistance due to the cathode, the cathode-electrolyte interphase, the anode and the anode-electrolyte interphase. In the absence of voltage delay, the resistance due to passivated films on the anode and/or cathode is negligible. However, the formation of a surface film is unavoidable for alkali metal, and in particular, lithium metal anodes, and for lithium intercalated carbon anodes, due to their relatively low potential and high reactivity towards organic electrolytes. Thus, the ideal anode surface film should be electrically insulating and ionically conducting. While most alkali metal, and in particular, lithium electrochemical systems meet the first requirement, the second requirement is difficult to achieve. In the event of voltage delay, the resistance of these films is not negligible, and as a result, impedance builds up inside the cell due to this surface layer formation which often results in reduced discharge voltage and reduced cell capacity. In other words, the drop in potential between the background voltage and the lowest voltage under pulse discharge conditions, excluding voltage delay, is an indication of the conductivity of the cell, i.e., the conductivity of the cathode, anode, electrolyte, and surface films, while the gradual decrease in cell potential during the application of the pulse train is due to the polarization of the electrodes and electrolyte.

Thus, the existence of voltage delay is an undesirable characteristic of alkali metal/mixed metal oxide cells subjected to current pulse discharge conditions in terms of its influence on devices such as medical devices including implantable pacemakers and cardiac defibrillators. Voltage delay is undesirable because it limits the effectiveness and even the proper functioning of both the cell and the associated electrically powered device under current pulse discharge conditions.

2. Prior Art

One of the known solutions to the above problem is to saturate the electrolyte solution with carbon dioxide $CO_2$. Cycling efficiency is improved dramatically in secondary cell systems having a lithium anode activated with $CO_2$ saturated electrolytes (V. R. Koch and S. B. Brummer, *Electrochimica Acta*, 1978, 23, 55–62; U.S. Pat. No. 4,853,304 to Ebner et al.; D. Aurbach, Y. Gofer, M. Ben-Zion and P. Aped, *J. Electroanal. Chem.* 1992, 339, 451–471). U.S. Pat. No. 5,569,558 to Takeuchi et al. relates to the provision of a $CO_2$ saturated electrolyte for alleviating the presence of voltage delay in primary cells having a mixed transition metal oxide cathode such as lithium/silver vanadium oxide cells. The same effect is also known for lithium intercalated carbon anode secondary batteries (D. Aurbach, Y. Ein-Eli, O. Chusid, Y. Carmeli, M. Babai and H. Yamin, *J. Electrochem. Soc.* 1994, 141, 603–611). Sulfur dioxide ($SO_2$) has also been reported to be another additive that improves charge-discharge cycling in rechargeable lithium ion cells (Y. Ein-Eli, S. R. Thomas and V. R. Koch, *J. Electrochem. Soc.* 1996, 143, L195–L197).

In spite of the success of $CO_2$ and $SO_2$ in improving cell discharge characteristics, their use has been limited. One problem associated with both $CO_2$ and $SO_2$ as electrolyte additives is that they are in a gaseous state at room temperature, and are thus difficult to handle. Also, it is difficult to control the dissolved concentration of $CO_2$. Best results are achieved at pressures of up to 50 psig., which further detracts from the practicality of this additive.

Instead of carbon dioxide and sulfur dioxide, the present invention is directed to the provision of organic dicarbonate additives in the electrolyte of an alkali metal electrochemical cell to beneficially modify the anode surface film. The dicarbonate additives are defined herein as organic monoalkyl or a dialkyl dicarbonate compounds provided as a co-solvent with commonly used organic aprotic solvents. The organic dicarbonate additives are in a condensed phase which makes them easy to handle in electrolyte preparation. When used as a co-solvent in an activating electrolyte, the dicarbonate additives interact with the alkali metal anode to form an ionically conductive surface protective layer thereon. The conductive surface layer improves the discharge performance of the alkali metal electrochemical cell and minimizes or even eliminates voltage delay in the high current pulse discharge of such cells.

SUMMARY OF THE INVENTION

The object of the present invention is to improve the pulse discharge performance of an alkali metal electrochemical cell, and more particularly a primary lithium electrochemical cell, by the provision of at least one of a family of dicarbonate additives, preferably a mono-alkyl or a dialkyl compound as a co-solvent in the cell's activating nonaqueous electrolyte solution. Due to the high reduction potentials of the dicarbonate group vs. lithium, the dicarbonate additives compete effectively with the other electrolyte co-solvents or the solute to react with the lithium anode. Lithium dicarbonate or the lithium salt of dicarbonate reduction products are believed to be the major reaction products. These lithium salts are believed to deposit on the anode surface to form an ionically conductive protective film thereon. As a consequence, the chemical composition and perhaps the morphology of the anode surface protective layer is changed, and this proves beneficial to the discharge characteristics of the cell.

The thusly fabricated cell exhibits reduced or no appreciable voltage delay under current pulse discharge usage, which is an unexpected result. More particularly, the present invention is directed to the introduction of at least one dicarbonate additive into the electrolyte of a lithium/silver vanadium oxide electrochemical cell for the purpose of reducing and/or eliminating voltage delay during pulse discharging applications. Alkali metal/transition metal oxide electrochemical systems are typically activated with an electrolyte comprising a relatively low viscosity solvent and a relatively high permittivity solvent. The solute of the electrolyte is an inorganic alkali metal salt wherein the alkali metal of the salt is the same as the alkali metal of the anode. The dicarbonate compound of the present invention is introduced into the electrolyte as an additive to interact with the alkali metal anode, and particularly with the lithium anode, to form an ionically conductive protective anode surface layer which improves the discharge performance of the cell, and minimizes or even eliminates voltage delay in current pulse discharge conditions. Therefore, the present invention is directed to a novel electrolyte solution provided in operative association with an electrochemical system incorporated into a defibrillator battery to minimize or even eliminate voltage delay under high current pulse discharge conditions.

These and other objects of the present invention will become increasingly more apparent to those skilled in the art by reference to the following description and to the appended drawings.

DETAILED DESCRIPTION OF THE PREFERRED EMBODIMENTS

As used herein, the term "pulse" means a short burst of electrical current of a significantly greater amplitude than that of a prepulse current immediately prior to the pulse. A pulse train consists of at least two pulses of electrical current delivered in relatively short succession with or without open circuit rest between the pulses.

The electrochemical cell of the present invention includes an anode selected from Groups IA, IIA or IIIB of the Periodic Table of Elements, including lithium, sodium, potassium, etc., and their alloys and intermetallic compounds including, for example Li-Si, Li-B and Li-Si-B alloys and intermetallic compounds. The preferred anode comprises lithium, and the more preferred anode comprises a lithium alloy, the preferred lithium alloy being a lithium-aluminum alloy. The greater the amount of aluminum present by weight in the alloy, however, the lower the energy density of the cell.

The form of the anode may vary, but preferably the anode is a thin metal sheet or foil of the anode metal, pressed or rolled on a metallic anode current collector, i.e., preferably comprising nickel, to form an anode component. In the exemplary cell of the present invention, the anode component has an extended tab or lead of the same material as the anode current collector, i.e., preferably nickel, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The cathode is preferably of a solid material and the electrochemical reaction at the cathode involves conversion of ions which migrate from the anode to the cathode in atomic or molecular forms. The solid cathode material may comprise a metal, a metal oxide, a mixed metal oxide, a metal sulfide or a carbonaceous compound, and combinations thereof. The metal oxide, the mixed metal oxide and the metal sulfide can be formed by the chemical addition, reaction, or otherwise intimate contact of various metal oxides, metal sulfides and/or metal elements, preferably during thermal treatment, sol-gel formation, chemical vapor deposition or hydrothermal synthesis in mixed states. The active materials thereby produced contain metals, oxides and sulfides of Groups IB, IIB, IIIB, IVB, VB, VIB, VIIB and VIII, which includes the noble metals and/or other oxide and sulfide compounds.

One preferred mixed metal oxide has the general formula $SM_xV_2O_y$ wherein SM is a metal selected from Groups IB to VIIB and VIII of the Periodic Table of Elements, wherein x is about 0.30 to 2.0 and y is about 4.5 to 6.0 in the general formula. By way of illustration, and in no way intended to be limiting, one exemplary cathode active material comprises silver vanadium oxide (SVO) having the general formula $Ag_xV_2O_y$, in any one of its many phases, i.e., β-phase silver vanadium oxide having in the general formula x=0.35 and y=5.8, γ-phase silver vanadium oxide having in the general formula x=0.74 and y=5.37 and ε-phase silver vanadium oxide having in the general formula x=1.0 and y=5.5, and combination and mixtures of phases thereof. For a more detailed description of such a cathode active material, reference is made to U.S. Pat. No. 4,310,609 to Liang et al., which is assigned to the assignee of the present invention and incorporated herein by reference.

Another preferred composite cathode active material includes $V_2O_z$ wherein $z \leq 5$ combined with $Ag_2O$ with the silver in either the silver(II), silver(I) or silver(0) oxidation state and CuO with the copper in either the copper(II), copper(I) or copper(0) oxidation state to provide the mixed metal oxide having the general formula $Cu_xAg_yV_2O_z$, (CSVO). Thus, this composite cathode active material may be described as a metal oxide-metal oxide-metal oxide, a metal-metal oxide-metal oxide, or a metal-metal-metal oxide and the range of material compositions found for $Cu_xAg_yV_2O_z$ is preferably about $0.01 \leq x \leq 1.0$, about $0.01 \leq y \leq 1.0$ and about $5.01 \leq z \leq 6.5$. Typical forms of CSVO are $Cu_{0.16}Ag_{0.67}V_2O_z$ with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium. For a more detailed description of this cathode active material, reference is made to U.S. Pat. Nos. 5,472,810 to Takeuchi et al. and 5,516,340 to Takeuchi et al., both of which are assigned to the assignee of the present invention and incorporated herein by reference.

Additional cathode active materials include manganese dioxide, lithium cobalt oxide, lithium nickel oxide, copper vanadium oxide, titanium disulfide, copper oxide, copper sulfide, iron sulfide, iron disulfide, and fluorinated carbon, and mixtures thereof. Preferably, the cathode comprises from about 80 to about 99 weight percent of the cathode active material.

Cathode active materials prepared as described above are preferably mixed with a binder material such as a powdered fluoro-polymer, more preferably powdered polytetrafluoro-ethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 3 weight percent, a conductive diluent present at about 3 weight percent and about 94 weight percent of the cathode active material. The cathode active mixture may be in the form of one or more plates operatively associated with at least one or more plates of anode material, or in the form of a strip wound with a corresponding strip of anode material in a structure similar to a "jellyroll".

In order to prevent internal short circuit conditions, the cathode is separated from the Group IA, IIA or IIIB anode material by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include woven and non-woven fabrics of polyolefinic fibers or fluoropolymeric fibers including polyvinylidene fluoride, polyethylenetetrafluoro-ethylene, and polyethylenechlorotrifluoroethylene laminated or superposed with a polyolefinic or a fluoropolymeric microporous film. Suitable microporous films include a polytetrafluoro-ethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.). The separator may also be composed of non-woven glass, glass fiber materials and ceramic materials.

The form of the separator typically is a sheet which is placed between the anode and cathode electrodes and in a manner preventing physical contact therebetween. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

The electrochemical cell of the present invention further includes a nonaqueous, ionically conductive electrolyte operatively associated with the anode and the cathode electrodes. The electrolyte serves as a medium for migration of ions between the anode and the cathode during the electrochemical reactions of the cell and nonaqueous solvents suitable for the present invention are chosen so as to exhibit those physical properties necessary for ionic transport (low viscosity, low surface tension and wettability). Suitable nonaqueous solvents are comprised of an inorganic salt dissolved in a nonaqueous solvent and more preferably an alkali metal salt dissolved in a mixture of aprotic organic solvents comprising a low viscosity solvent including organic esters, ethers and dialkyl carbonates, and mixtures thereof, and a high permittivity solvent including cyclic carbonates, cyclic esters and cyclic amides, and mixtures thereof. Low viscosity solvents include tetrahydrofuran (THF), methyl acetate (MA), diglyme, triglyme, tetraglyme, 1,2-dimethoxyethane (DME), 1,2-diethoxyethane (DEE), 1-ethoxy, 2-methoxyethane (EME), dimethyl carbonate (DMC), diethyl carbonate (DEC), dipropyl carbonate (DPC), ethyl methyl carbonate (EMC), methyl propyl carbonate (MPC) and ethyl propyl carbonate (EPC), and mixtures thereof. High permittivity solvents include propylene carbonate (PC), ethylene carbonate (EC), butylene carbonate (BC), acetonitrile, dimethyl sulfoxide, dimethyl formamide, dimethyl acetamide, γ-butyrolactone (GBL) and N-methyl-pyrrolidinone (NMP), and mixtures thereof.

The preferred electrolyte comprises an inorganic alkali metal salt, and in the case of an anode comprising lithium, the alkali metal salt of the electrolyte is a lithium based salt. Known lithium salts that are useful as a vehicle for transport of alkali metal ions from the anode to the cathode include $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$ and $LiCF_3SO_3$, and mixtures thereof. Suitable salt concentrations typically range between about 0.8 to 1.5 molar, and a preferred electrolyte for a lithium/transition metal oxide electrochemical cell includes $LiAsF_6$ or $LiPF_6$ dissolved in a 50:50 mixture, by volume, of PC and DME.

In accordance with the present invention, at least one organic dicarbonate additive is provided as a co-solvent in the electrolyte solution of the previously described alkali metal electrochemical cell. The dicarbonate additive is preferably an alkyl dicarbonate compound having the general formula $(R^1O)C(=O)OC(=O)(OR^2)$, wherein $R^1$ and $R^2$ are the same or different, and they can be a hydrogen atom or a saturated or unsaturated hydrocarbon or heteroatom organic group containing 1 to 13 carbon atoms, and at least $R^1$ has the structure $(R^3)(R^4)(R^5)C$— if $R^2 \neq H$ and wherein $R^3$, $R^4$ and $R^5$ are the same or different, and they can be a hydrogen atom or a saturated or unsaturated hydrocarbon or heteroatom group and at least $R^3$ is an unsaturated organic or an inorganic group if $R^4$ is a hydrogen atom. The greatest effect is found when dibenzyl dicarbonate, diallyl dicarbonate, di-t-butyl dicarbonate, methyl benzyl dicarbonate, ethyl benzyl dicarbonate, propyl benzyl dicarbonate, butyl benzyl dicarbonate, methyl allyl dicarbonate, ethyl allyl dicarbonate, propyl allyl dicarbonate, mono-methyl dicarbonate, mono-ethyl dicarbonate, mono-butyl dicarbonate, mono-propyl dicarbonate, mono-allyl dicarbonate, mono-benzyl dicarbonate, cyanomethyl methyl dicarbonate and nitromethyl methyl dicarbonate, and mixtures thereof are used as additives in the electrolyte.

The above described compounds are only intended to be exemplary of those that are useful with the present invention, and are not to be construed as limiting. Those skilled in the art will readily recognize dicarbonate compounds which come under the purview of the general formula set forth above and which will be useful as additives for the electrolyte to reduce voltage delay according to the present invention.

While not intending to be bound by any particular mechanism, it is believed that due to the presence of the C=O bonds in the dicarbonate functional group, [—OC(=O)OC(=O)O—], the bond between oxygen and at least one of the group $R^1$ and $R^2$ is severed and the dicarbonate intermediate is able to compete effectively with the other electrolyte solvents or solutes to react with lithium and form a dicarbonate salt, i.e., lithium dicarbonate, or the lithium salt of a dicarbonate reduction product on the surface of the anode. The resulting salt is ionically more conductive than lithium oxide which may form on the anode in the absence of the organic dicarbonate additive. As a consequence, the chemical composition and perhaps the morphology of the anode surface protective layer is believed to be changed with concomitant benefits to the cell's discharge characteristics.

In the present invention, the anode is lithium metal and the cathode is preferably the transition mixed metal oxide $AgV_2O_{5.5}$ (SVO). The preferred electrolyte is 1.0M to 1.2M $LiAsF_6$ dissolved in an aprotic solvent mixture comprising at least one of the above listed low viscosity solvents and at least one of the above listed high permittivity solvents. The preferred aprotic solvent mixture comprises a 50/50, by volume, mixture of propylene carbonate and dimethoxyethane. The concentration of the above discussed dicarbonate additives according to the present invention should preferably be in the range of between about 0.001M to about 0.40M. The positive effects of these additives in reducing voltage delay in a pulse discharging alkali metal cell have been achieved both at room temperature as well as at temperatures up to about 37° C. This makes the novel electrolyte solution of the present invention particularly useful for activating an alkali metal/transition metal oxide cell incorporated into an implantable medical device such as a cardiac defibrillator to minimize or even eliminate voltage delay under high current pulse discharge conditions.

As is well known by those skilled in the art, an implantable cardiac defibrillator is a device that requires a power source for a generally medium rate, constant resistance load component provided by circuits performing such functions as, for example, the heart sensing and pacing functions. From time to time, the cardiac defibrillator may require a generally high rate, pulse discharge load component that occurs, for example, during charging of a capacitor in the defibrillator for the purpose of delivering an electrical shock to the heart to treat tachyarrhythmias, the irregular, rapid heart beats that can be fatal if left uncorrected. Reduction and even elimination of voltage delay during a current pulse application is important for proper device operation and extended device life.

The assembly of the cell described herein is preferably in the form of a wound element cell. That is, the fabricated cathode, anode and separator are wound together in a "jellyroll" type configuration or "wound element cell stack" such that the anode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium, tantalum or aluminum, but not limited thereto, so long as the metallic material is compatible for use with components of the cell.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23 or FUSITE 425 or FUSITE 435. The positive terminal pin feedthrough preferably comprises titanium although molybdenum, aluminum, nickel alloy, or stainless steel can also be used. The cell header comprises elements having compatibility with the other components of the electrochemical cell and is resistant to corrosion. The cathode lead is welded to the positive terminal pin in the glass-to-metal seal and the header is welded to the case containing the electrode stack. The cell is thereafter filled with the electrolyte solution comprising at least one of the dicarbonate additives described hereinabove and hermetically sealed such as by close-welding a stainless steel ball over the fill hole, but not limited thereto.

The above assembly describes a case-negative cell, which is the preferred construction of the exemplary cell of the present invention. As is well known to those skilled in the art, the exemplary electrochemical system of the present invention can also be constructed in a case-positive configuration.

The following examples describe the manner and process of an electrochemical cell according to the present invention, and set forth the best mode contemplated by the inventors of carrying out the invention, but are not construed as limiting.

EXAMPLE I

Lithium anode material was pressed on nickel current collector screen and silver vanadium oxide cathode material was pressed on titanium current collector screen. A prismatic cell stack assembly configuration with two layers of microporous membrane polypropylene separator sandwiched between the anode and cathode was prepared. The electrode assembly was then hermetically sealed in a stainless steel casing in a case-negative configuration. Three cells were activated with the standard electrolyte consisting of 1.0M $LiAsF_6$ dissolved in a 50:50, by volume, mixture of PC and DME without an organic dicarbonate additive (Group 1). Fifteen cells (three cells per group) were activated with the same electrolyte used to activate the Group 1 cells and further containing 0.005M, 0.01M, 0.05M, 0.10M, or 0.20M of dibenzyl dicarbonate (DBDC), as set forth in Table 1.

TABLE 1

| Cell Construction | | | |
|---|---|---|---|
| Group | [LiASF$_6$] | PC:DME | [DBDC] |
| 1 | 1.0M | 50:50 | 0.00M |
| 2 | 1.0M | 50:50 | 0.005M |
| 3 | 1.0M | 50:50 | 0.01M |
| 4 | 1.0M | 50:50 | 0.05M |
| 5 | 1.0M | 50:50 | 0.10M |
| 6 | 1.0M | 50:50 | 0.20M |

A constant resistance load of 3.57 kΩ was applied to all of the cells for 21 hours during an initial predischarge period. The predischarge period is referred to as burn-in and depleted the cells of approximately 1% of their theoretical capacity. Following burn-in, the cells were subjected to acceptance pulse testing consisting of four 10 second pulses (23.2 mA/cm$^2$) with a 15 second rest between each pulse. The average discharge readings for the pre-pulse potentials, voltage delay and pulse minimum potentials during acceptance pulse testing for these pulse trains are summarized in Table 2. Voltage delay is calculated as pulse 1 end potential minus pulse 1 minimum potential.

TABLE 2

Acceptance Pulse Train Voltages (average)

| Group | [DBDC] | Ppre1 | V-Delay | P1 min | P4 min |
|---|---|---|---|---|---|
| 1 | 0.00M | 3.261 | 0.254 | 2.436 | 2.654 |
| 2 | 0.005M | 3.259 | 0.354 | 2.288 | 2.630 |
| 3 | 0.01M | 3.258 | 0.350 | 2.248 | 2.603 |
| 4 | 0.05M | 3.263 | 0.133 | 2.429 | 2.552 |
| 5 | 0.10M | 3.265 | 0.037 | 2.518 | 2.552 |
| 6 | 0.20M | 3.263 | 0.003 | 2.547 | 2.533 |

The data in Table 2 clearly demonstrates the dicarbonate additive effect. All groups of cells presented similar pre-pulse potentials and all cells exhibited voltage delay. However, the extent of voltage delay was significantly smaller for the groups 5 and 6 cells with high DBDC additive concentrations. As a result, the pulse 1 minimum potentials of those cells was higher than that of the control cells. At lower DBDC concentrations, the groups 2 and 3 cells exhibited higher voltage delay than that of the control cells. In all cases, the control cells still presented the highest pulse 4 minimum potentials.

Following acceptance pulse testing, all of the cells were discharged under loads of 11.1 kohms with superimposed pulse trains applied every 38 days. The pulse trains consisted of four 10 second pulses (23.2 mA/cm$^2$) with 15 seconds rest between each pulse. The average discharge readings for the pre-pulse potentials, voltage delay and pulse minimum potentials for pulse trains 1 to 8 are summarized in Tables 3 to 10, respectively.

TABLE 3

Pulse Train 1 Voltages (average)

| Group | [DBDC] | Ppre1 | V-Delay | P1 min | P4 min |
|---|---|---|---|---|---|
| 1 | 0.00M | 3.203 | 0.000 | 2.599 | 2.476 |
| 2 | 0.005M | 3.198 | 0.000 | 2.559 | 2.443 |
| 3 | 0.01M | 3.198 | 0.000 | 2.520 | 2.406 |
| 4 | 0.05M | 3.206 | 0.000 | 2.496 | 2.370 |
| 5 | 0.10M | 3.203 | 0.001 | 2.495 | 2.372 |
| 6 | 0.20M | 3.192 | 0.001 | 2.467 | 2.341 |

In pulse train 1 (Table 3), none of the cells exhibited any appreciable voltage delay. However, the group 1 cells without additive presented the highest pulse minimum potentials. The higher the DBDC concentration, the lower the pulse minimum potentials were. The largest differences between group 1 and group 6 cells were 132 mV for P1min and 135 mV for P4min.

TABLE 4

Pulse Train 2 Voltages (average)

| Group | [DBDC] | Ppre1 | V-Delay | P1 min | P4 min |
|---|---|---|---|---|---|
| 1 | 0.00M | 3.137 | 0.000 | 2.508 | 2.395 |
| 2 | 0.005M | 3.132 | 0.000 | 2.460 | 2.357 |
| 3 | 0.01M | 3.130 | 0.000 | 2.435 | 2.336 |
| 4 | 0.05M | 3.126 | 0.000 | 2.411 | 2.314 |

TABLE 4-continued

Pulse Train 2 Voltages (average)

| Group | [DBDC] | Ppre1 | V-Delay | P1 min | P4 min |
|---|---|---|---|---|---|
| 5 | 0.10M | 3.122 | 0.000 | 2.404 | 2.312 |
| 6 | 0.20M | 3.114 | 0.000 | 2.393 | 2.300 |

Similar to pulse train 1, in pulse train 2 (Table 4), none of the cells exhibited voltage delay. Again, the group 1 cells without the dicarbonate additive presented the highest pulse minimum potentials. The higher the DBDC concentration, the lower the pulse minimum potentials were. The largest differences between the group 1 and the group 6 cells was 115 mV for P1min and 95 mV for P4min.

TABLE 5

Pulse Train 3 Voltages (average)

| Group | [DBDC] | Ppre1 | V-Delay | P1 min | P4 min |
|---|---|---|---|---|---|
| 1 | 0.0M | 2.843 | 0.001 | 2.329 | 2.274 |
| 2 | 0.005M | 2.836 | 0.000 | 2.276 | 2.233 |
| 3 | 0.01M | 2.829 | 0.000 | 2.249 | 2.207 |
| 4 | 0.05M | 2.830 | 0.000 | 2.232 | 2.184 |
| 5 | 0.10M | 2.835 | 0.000 | 2.215 | 2.184 |
| 6 | 0.20M | 2.839 | 0.001 | 2.199 | 2.167 |

Similar to pulse trains 1 and 2, in pulse train 3 (Table 5), none of the cells exhibited any appreciable voltage delay. The group 1 cells without additive still presented the highest pulse minimum potentials. Also, the higher the DBDC concentration, the lower the pulse minimum potentials were. The largest differences between the group 1 and the group 6 cells were 130 mV for P1min and 107 mV for P4min.

TABLE 6

Pulse Train 4 Voltages (average)

| Group | [DBDC] | Ppre1 | V-Delay | P1 min | P4 min |
|---|---|---|---|---|---|
| 1 | 0.00M | 2.582 | 0.204 | 1.997 | 2.187 |
| 2 | 0.005M | 2.576 | 0.000 | 2.179 | 2.163 |
| 3 | 0.01M | 2.570 | 0.000 | 2.151 | 2.129 |
| 4 | 0.05M | 2.571 | 0.000 | 2.123 | 2.097 |
| 5 | 0.10M | 2.574 | 0.001 | 2.121 | 2.094 |
| 6 | 0.20M | 2.575 | 0.000 | 2.106 | 2.078 |

In pulse train 4 (Table 6), only the group 1 cells exhibited significant voltage delay (~200 mV). None of the other groups of cels with the DBDC additive exhibited any voltage delay. As a result, all of the cells with the DBDC additive presented higher P1min potentials than that of the control cells. In fact, the lowest pulse minimum potential of the groups 2 to 6 cells (2.078V of group 6 cells) was still higher than the P1min potentials of the control cells (group 1).

TABLE 7

Pulse Train 5 Voltages (average)

| Group | [DBDC] | Ppre1 | V-Delay | P1 min | P4 min |
|---|---|---|---|---|---|
| 1 | 0.00M | 2.539 | 0.075 | 1.794 | 1.944 |
| 2 | 0.005M | 2.538 | 0.073 | 1.957 | 2.067 |
| 3 | 0.01M | 2.536 | 0.001 | 2.095 | 2.075 |
| 4 | 0.05M | 2.536 | 0.000 | 2.085 | 2.048 |

TABLE 7-continued

Pulse Train 5 Voltages (average)

| Group | [DBDC] | Ppre1 | V-Delay | P1 min | P4 min |
|---|---|---|---|---|---|
| 5 | 0.10M | 2.533 | 0.000 | 2.075 | 2.043 |
| 6 | 0.20M | 2.533 | 0.001 | 2.039 | 2.009 |

In pulse train 5 (Table 7), all groups of cells had similar prepulse potentials. Only the group 1 cells (without DBDC additive) and the group 2 cells (with a low DBDC concentration) exhibited voltage delay. None of the other groups of cells exhibited any voltage delay. All of the cells with the DBDC additive presented higher P1min and P4min potentials than that of the control cells. The group 3 cells (0.01M DBDC) exhibited the highest pulse minimum potentials. At higher DBDC concentrations, the pulse minimum potentials decreased with an increase in the DBDC concentration.

TABLE 8

Pulse Train 6 Voltages (average)

| Group | [DBD] | Ppre1 | V-Delay | P1 min | P4 min |
|---|---|---|---|---|---|
| 1 | 0.00M | 2.506 | 0.032 | 1.801 | 1.835 |
| 2 | 0.005M | 2.499 | 0.129 | 1.712 | 1.831 |
| 3 | 0.01M | 2.497 | 0.001 | 2.012 | 1.940 |
| 4 | 0.05M | 2.490 | 0.000 | 2.020 | 1.925 |
| 5 | 0.10M | 2.496 | 0.000 | 2.025 | 1.951 |
| 6 | 0.20M | 2.497 | 0.000 | 1.968 | 1.896 |

In pulse train 6 (Table 8), the group 1 cells presented slightly higher pre-pulse potentials than all other groups of cells. Similar to pulse train 5, only group 1 (without additive) and group 2 cells (with low concentration of additive) exhibited voltage delay. None of the other groups of cells exhibited any appreciable voltage delay. Except for the group 2 cells, all of the cells with DBDC additive presented higher P1min and P4min voltages than that of group 1 control cells.

TABLE 9

Pulse Train 7 Voltages (average)

| Group | [DBDC] | Ppre1 | V-Delay | P1 min | P4 min |
|---|---|---|---|---|---|
| 1 | 0.00M | 2.316 | 0.000 | 1.544 | 1.389 |
| 2 | 0.005M | 2.285 | 0.000 | 1.636 | 1.454 |
| 3 | 0.01M | 2.280 | 0.000 | 1.745 | 1.537 |
| 4 | 0.05M | 2.274 | 0.000 | 1.766 | 1.578 |
| 5 | 0.10M | 2.294 | 0.000 | 1.773 | 1.588 |
| 6 | 0.20M | 2.305 | 0.000 | 1.667 | 1.500 |

In pulse train 7 (Table 9), none of the cells exhibited voltage delay. Although the group 1 control cells still presented slightly higher pre-pulse potentials than the other group of cells, they exhibited the lowest P1min and P4min potentials among all groups of cells.

TABLE 10

Pulse Train 8 Voltages (average)

| Group | [DBDC] | Ppre1 | V-Delay | P1 min | P4 min |
|---|---|---|---|---|---|
| 1 | 0.00M | 2.137 | 0.000 | 0.844 | 0.385 |
| 2 | 0.005M | 2.092 | 0.000 | 1.039 | 0.447 |

TABLE 10-continued

Pulse Train 8 Voltages (average)

| Group | [DBDC] | Ppre1 | V-Delay | P1 min | P4 min |
|---|---|---|---|---|---|
| 3 | 0.01M | 2.079 | 0.000 | 1.169 | 0.480 |
| 4 | 0.05M | 2.034 | 0.000 | 0.781 | 0.382 |
| 5 | 0.10M | 2.034 | 0.000 | 0.360 | 0.210 |
| 6 | 0.20M | 2.093 | 0.000 | 0.893 | 0.331 | in pulse train 8 (Table 10), all of the groups of cells had reached their end of life.

The data in Tables 3 to 10 demonstrate the beneficial effect that DBDC has on voltage delay in a pulse discharging electrochemical cell. All groups of cells had similar pre-pulse potentials. There was no voltage delay in pulse trains 1 to 3 for any of the cells. In pulse trains 1 to 3, the group 1 cells without the DBDC additive exhibited higher pulse minimum potentials than those of the groups 2 to 6 cells. In pulse trains 1 to 5, the trend is that the greater the DBDC concentration, the lower the pulse minimum potentials. However, in pulse trains 6 and 7, the greater the DBDC concentration, the higher the pulse minimum potentials for the cells in groups 2 to 5.

Figure 3:
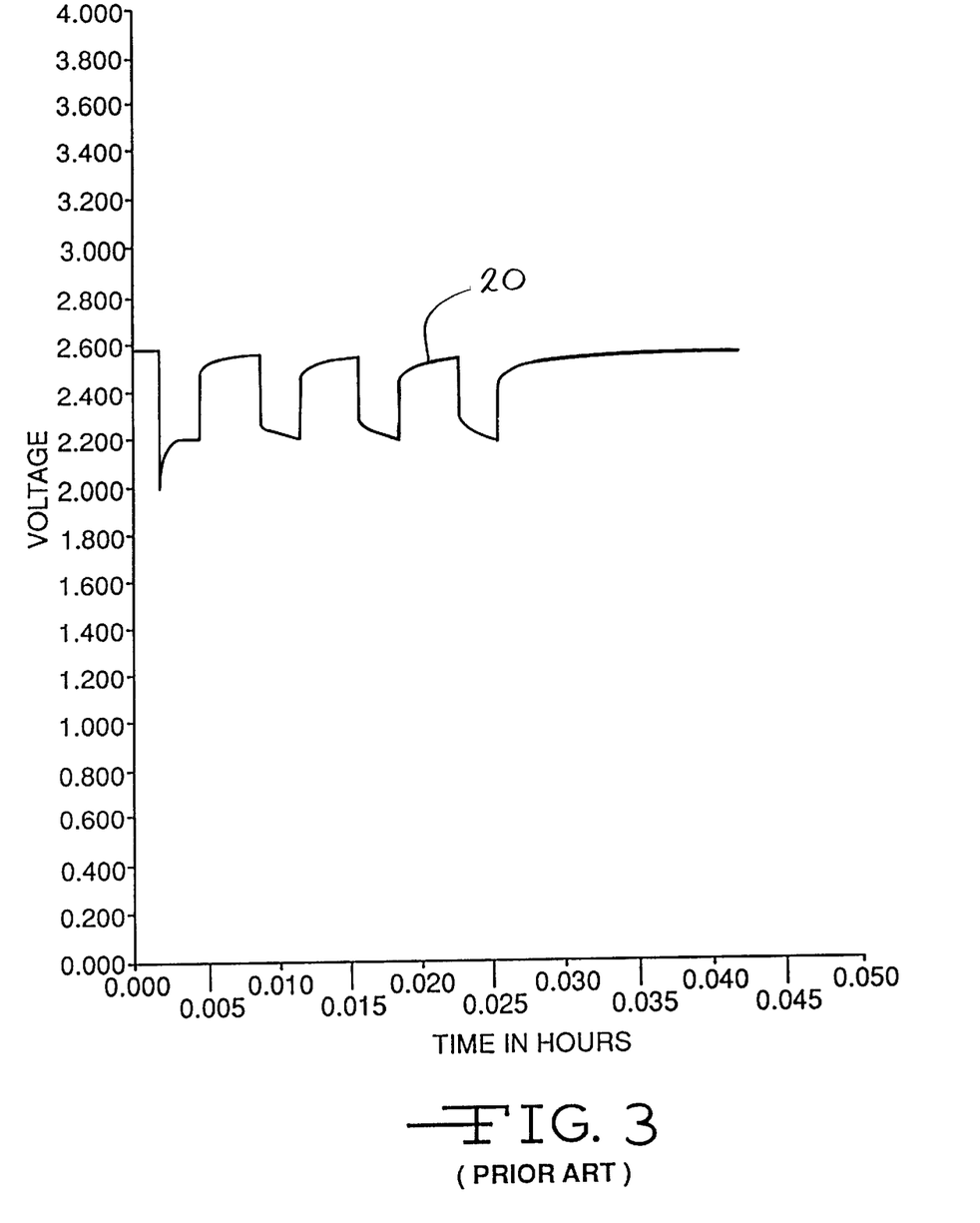
FIGS. 3 and 4 are graphs constructed from the pulse train 4 waveforms of Li/SVO cells activated with a nonaqueous electrolyte devoid of a dicarbonate compound and having 0.005M dibenzyl dicarbonate dissolved therein, respectively.
Figure 4:
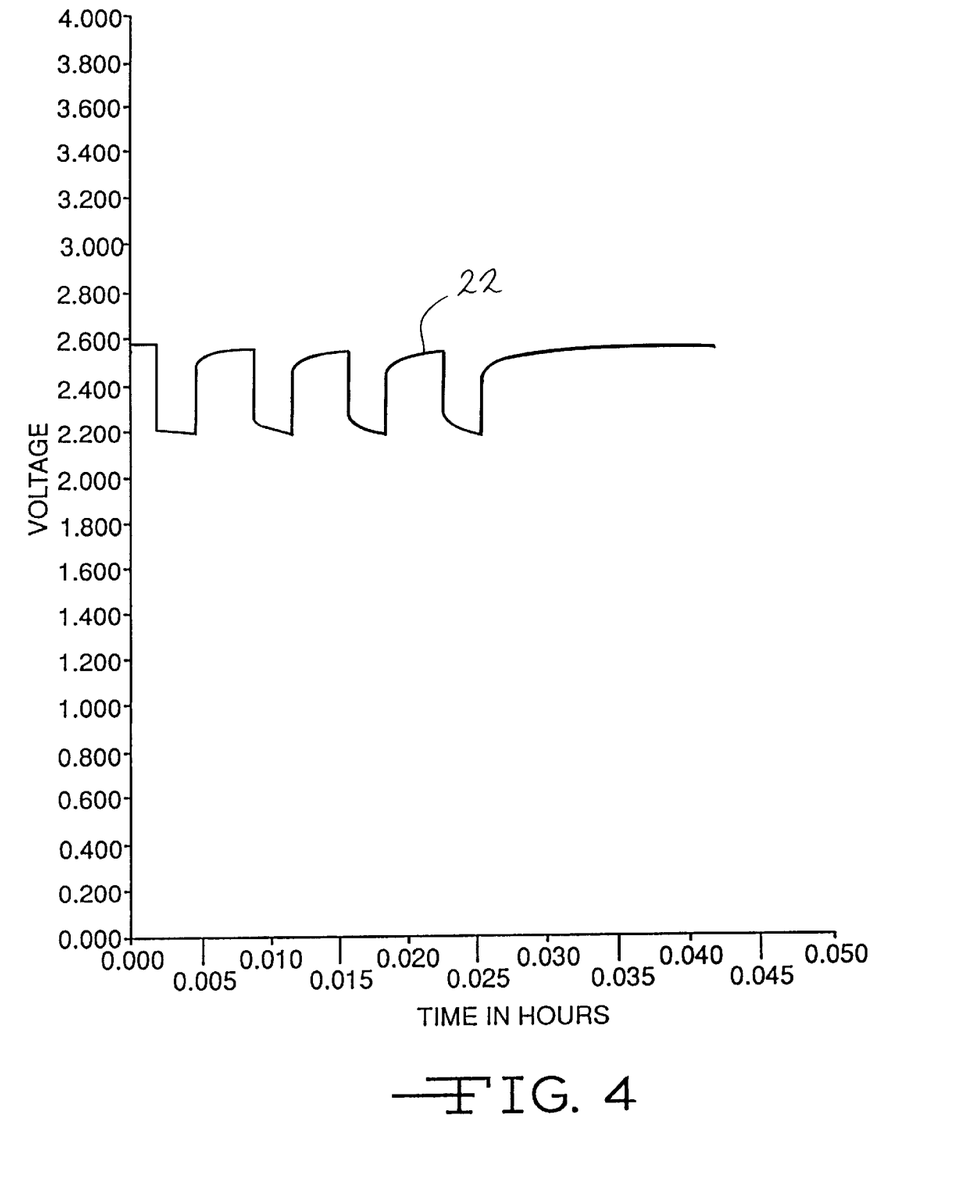

FIGS. 3 and 4 are presented for illustrative purposes to show the contrast in pulse train 4 between the group 1 cells, which exhibited voltage delay, with the group 2 cells. In particular, curve 20 in FIG. 3 was constructed from the pulse train 4 waveform of form of a representative group 1 cell devoid of the DBDC additive and curve 22 in FIG. 4 was constructed from the pulse train 4 waveform of a representative group 2 cell activated with the electrolyte having the DBDC additive at a concentration of 0.005M. In pulse train 4, all of the cells having the DBDC additive exhibited greater pulse 1 minimum potentials than those of the cells without the DBDC additive. However, the group 1 cells devoid of the DBDC additive still had the greatest pulse 4 minimum potentials.

COMPARATIVE EXAMPLE I

Eighteen cells were constructed in a similar manner as those described in Example I except for the dicarbonate additive. Specifically, three of the cells were activated with the standard electrolyte consisting of 1.0M LiAsF$_6$ dissolved in a 50:50, by volume, mixture of PC and DME without a dicarbonate additive (Group 1). Fifteen cells (three cells per group) were activated with the same electrolyte used to activate the Group 1 cells and further containing 0.005M, 0.01M, 0.05M, 0.10M, or 0.20M of dimethyl dicarbonate (DMDC). Dimethyl dicarbonate is a compound that is not preferred for use with the present invention.

In a similar manner as the cells discharged in Example I, a constant resistive load of 3.57 kΩ was applied to all of the cells for 21 hours during an initial predischarge burn-in period. Following burn-in, the cells were subjected to acceptance pulse testing consisting of four 10 second pulses (23.2 mA/cm$^2$) with a 15 second rest between each pulse. The averaged discharge readings for the pre-pulse potentials, voltage delay and pulse minimum potentials during acceptance pulse testing for these pulse trains are summarized in Table 11.

TABLE 11

Acceptance Pulse Train Voltages (average)

| Group | [DBDC] | Ppre1 | V-Delay | P1 min | P4 min |
|---|---|---|---|---|---|
| 1 | 0.00M | 3.276 | 0.453 | 2.062 | 2.500 |
| 2 | 0.005M | 3.273 | 0.885 | 1.586 | 2.483 |
| 3 | 0.01M | 3.274 | 0.920 | 1.583 | 2.497 |
| 4 | 0.05M | 3.258 | 0.639 | 1.779 | 2.407 |
| 5 | 0.10M | 3.248 | 0.228 | 1.734 | 1.937 |
| 6 | 0.20M | 3.251 | 0.089 | 1.412 | 1.627 |

In acceptance pulse train, the groups 4 to 6 cells with high DMDC concentration presented lower pre-pulse potentials than other groups of cells. All cells exhibited voltage delay. The groups 2 to 4 cells with low DMDC concentrations exhibited higher voltage delay than that of the group 1 control cells. All cells with DMDC additive presented lower P4min and significantly lower P1min potentials than that of the control cells.

Following acceptance pulse testing, all of the cells were discharged under loads of 9.53 kohm with superimposed pulse trains applied every 39 days. The pulse trains consisted of four 23.2 mA/cm$^2$, 10 second pulses with 15 seconds rest between each pulse. The average discharge reading for the pre-pulse potentials, voltage delay and pulse minimum potentials for pulse train 1 to 4 are summarized in Tables 12 to 15, respectively.

TABLE 12

Pulse Train 1 Voltages (average)

| Group | [DMDC] | Ppre1 | V-Delay | P1 min | P4 min |
|---|---|---|---|---|---|
| 1 | 0.00M | 3.229 | 0.013 | 2.622 | 2.542 |
| 2 | 0.005M | 3.229 | 0.001 | 2.606 | 2.508 |
| 3 | 0.01M | 3.228 | 0.030 | 2.578 | 2.517 |
| 4 | 0.05M | 3.221 | 0.201 | 2.245 | 2.391 |
| 5 | 0.10M | 3.218 | 0.000 | 2.205 | 2.179 |
| 6 | 0.20M | 3.219 | 0.000 | 2.030 | 2.088 |

In pulse train 1, the group 1 control cells and group 3 cells exhibited small voltage delay. The group 4 cells exhibited large voltage delay. All of the cells with DMDC additive still presented significantly lower pulse minimum potentials than that of the control cells.

TABLE 13

Pulse Train 2 Voltages (average)

| Group | [DMDC] | Ppre1 | V-Delay | P1 min | P4 min |
|---|---|---|---|---|---|
| 1 | 0.0M | 3.158 | 0.000 | 2.545 | 2.427 |
| 2 | 0.005M | 3.158 | 0.000 | 2.537 | 2.414 |
| 3 | 0.01M | 3.159 | 0.000 | 2.530 | 2.414 |
| 4 | 0.05M | 3.151 | 0.104 | 2.259 | 2.284 |
| 5 | 0.10M | 3.151 | 0.001 | 2.317 | 2.206 |
| 6 | 0.20M | 3.154 | 0.000 | 2.356 | 2.223 |

In pulse train 2, only the group 4 cells exhibited voltage delay. The groups 2 and 3 cells with low DMDC concentrations exhibited slightly lower pulse minimum potentials than that of the control cells. Notably, the groups 4 to 6 cells with high DMDC concentrations presented significantly lower pulse minimum potentials than that of the control cells.

TABLE 14

Pulse Train 3 Voltages (average)

| Group | [DMDC] | Ppre1 | V-Delay | P1 min | P4 min |
|---|---|---|---|---|---|
| 1 | 0.00M | 2.880 | 0.000 | 2.388 | 2.297 |
| 2 | 0.005M | 2.875 | 0.000 | 2.362 | 2.276 |
| 3 | 0.01M | 2.882 | 0.000 | 2.360 | 2.275 |
| 4 | 0.05M | 2.879 | 0.000 | 2.299 | 2.206 |
| 5 | 0.10M | 2.870 | 0.000 | 2.227 | 2.112 |
| 6 | 0.20M | 2.873 | 0.000 | 2.239 | 2.115 |

In pulse train 3, none of the cells exhibited voltage delay. The group 1 control cells still presented the highest pulse minimum potentials among all groups of cells.

TABLE 15

Pulse Train 4 Voltages (average)

| Group | [DMDC] | Ppre1 | V-Delay | P1 min | P4 min |
|---|---|---|---|---|---|
| 1 | 0.00M | 2.615 | 0.072 | 2.110 | 2.180 |
| 2 | 0.005M | 2.597 | 0.260 | 1.925 | 2.161 |
| 3 | 0.01M | 2.605 | 0.263 | 1.922 | 2.162 |
| 4 | 0.05M | 2.611 | 0.037 | 2.083 | 2.094 |
| 5 | 0.10M | 2.598 | 0.000 | 2.054 | 2.013 |
| 6 | 0.20M | 2.596 | 0.008 | 2.054 | 2.022 |

In pulse train 4, the control cells exhibited voltage delay. The groups 2 and 3 cells with low DMDC concentrations exhibited larger voltage delay and resulted in significantly lower P1min potentials than that of the control cells. Although the groups 4 to 6 cells with high DMDC concentrations exhibited smaller or no voltage delay, they still presented lower P1min potentials than that of the control cells. The group 1 control cells still had the highest P4min potentials among all groups of cells.

The above results demonstrate that cells with DMDC additive exhibited no beneficial effect on SVO cell pulse performance.

Accordingly, a suitable dicarbonate additive according to the present invention should contain an activated C—O bond. In the case of dimethyl dicarbonate, $CH_3$—O—C(O)—O—C(O)—O—$CH_3$, the C—O bond is very strong and the dissociation product, methyl radical, is very unstable. Therefore, DMDC is not a good additive. In contrast, dibenzyl dicarbonate, $PhCH_2$—O—C(O)—O—C(O)—O—$CH_2Ph$, has a relatively weak C—O bond due to the activation of the α-phenyl groups. The bond dissociation radical product, benzyl radical, is stabilized by orbital delocalization. Thus, a good dicarbonate additive will have the formula, $(R^1O)C(=O)OC(=O)(OR^2)$, wherein $R^1$ and $R^2$ are the same or different, and they can be a hydrogen atom or a saturated or unsaturated hydrocarbon or heteroatom organic group containing 1 to 13 carbon atoms and at least $R^1$ has the structure $(R^3)(R^4)(R^5)C$— and wherein $R^3$, $R^4$ and $R^5$ are the same or different, and they can be a hydrogen atom or a saturated or unsaturated hydrocarbon or heteroatom group and at least $R^3$ is an unsaturated organic or an inorganic group if $R^4$ is a hydrogen atom. Examples of suitable unsaturated organic or inorganic groups include an aromatic group, alkene and alkyne groups, nitro and nitrile groups. Representative dicarbonate additives according to the present invention include: dibenzyl dicarbonate, diallyl dicarbonate, di-t-butyl dicarbonate, mono-benzyl dicarbonate, mono-allyl dicarbonate, mono-methyl dicarbonate, mono-ethyl dicarbonate, mono-propyl dicarbonate, mono-butyl dicarbonate, methyl benzyl dicarbonate, ethyl benzyl dicarbonate, propyl benzyl dicarbonate, butyl benzyl dicarbonate, methyl allyl dicarbonate, ethyl allyl dicarbonate, propyl allyl dicarbonate, cyanomethyl methyl dicarbonate and nitromethyl methyl dicarbonate, and mixtures thereof.

While not intended to be bound by any particular theory, it is believed that the formation of O=C—O—C(=O)(O—Li)$_n$(OR)$_m$ (n=1 or 2; m=0 or 1) or its reaction products deposited on the anode surface is responsible for the improved performance of an alkali metal/transition metal oxide cell, and in particular Li/SVO cells. If the R group in the dicarbonate additive is hydrogen (acidic proton), it will react with lithium metal to form an O—Li bond directly. In addition, if the R group is activated (benzyl for example), the O—R bond is relatively weak. During reduction, the O—R bond breaks to form a product containing the C—O—Li salt group. This is believed to be the reason for the observed improvements in the pulse discharge performance of Li/SVO cells, as exemplified by those having the DBDC additive in Example I. As previously discussed in the BACKGROUND OF THE INVENTION section, voltage delay is a phenomenon typically exhibited by Li/SVO cells that have been depleted of 40% to 70% of their capacity. However, the cells discharged in Example I did not experience voltage delay during this portion of their useful life (pulse trains 4 and 5).

The concentration limit for the dicarbonate additive is preferably about 0.001M to about 0.40M. The beneficial effect of the dicarbonate additive will not be apparent if the additive concentration is less than about 0.001M. On the other hand, if the additive concentration is greater than about 0.40M, the beneficial effect will be cancelled by the detrimental effect of higher internal cell resistance due to the thicker anode surface film formation and lower electrolyte conductivity.

Thus, the existence of voltage delay is due to the formation of an anode surface passivation layer that is ionically less conductive than either the anode material itself or the electrolyte solution. In the presence of an alkyl dicarbonate additive according to the present invention, the anode passivation layer is chemically modified to be ionically more conductive than the passivation layer formed without the benefit of the additive. It is believed that due to the presence of the —OC(=O)OC(=O)O— functional group, the reductive cleavage of at least one of the OR$^1$ and OR$^2$ bonds in the dicarbonate additives of the present invention may produce lithium dicarbonate or the lithium salt of a dicarbonate reduction product on the anode surface. This surface film is ionically more conductive than the film formed in the absence of the additives and it is responsible for the increased cell performance, especially during pulse discharge applications. As a consequence, diminished voltage delay results when an alkali metal/transition metal oxide couple activated with a nonaqueous organic solvent having a dicarbonate additive dissolved therein according to the present invention is subjected to a pulse discharge application. This is particularly important in implantable medical devices powered by a cell according to the present invention.

It is appreciated that various modifications to the inventive concepts described herein may be apparent to those of ordinary skill in the art without departing from the spirit and scope of the present invention as defined by the appended claims.

What is claimed is:

1. An electrochemical cell, which comprises:
   a) an anode comprising an alkali metal;
   b) a solid cathode of electrically conductive material; and
   c) a nonaqueous electrolyte activating the anode and the cathode, the nonaqueous electrolyte comprising:
      i) a dicarbonate additive having the general formula: $(R^1O)C(=O)OC(=O)(OR^2)$, wherein $R^1$ and $R^2$ are the same or different and they can both be a hydrogen atom or one of $R^1$ and $R^2$ is a saturated or unsaturated organic group if the other of $R^1$ and $R^2$ is H or an unsaturated organic group and wherein when any one of $R^1$ and $R^2$ is an unsaturated organic group, the unsaturated organic group contain 2 to 13 carbon atoms and has the structure $(R^3)(R^4)(R^5)C$— with at least $R^3$ being an aromatic substituent or an unsaturated organic or inorganic group and $R^4$ and $R^5$ being a hydrogen atom or a saturated or unsaturated hydrocarbon or heteroatom group and wherein when $R^1$ and $R^2$ are the same they cannot be both saturated organic groups; and
      ii) an alkali metal salt dissolved therein.

2. The electrochemical cell of claim 1 wherein the dicarbonate additive is selected from the group consisting of dibenzyl dicarbonate, diallyl dicarbonate, methyl benzyl dicarbonate, ethyl benzyl dicarbonate, propyl benzyl dicarbonate, butyl benzyl dicarbonate, methyl allyl dicarbonate, ethyl allyl dicarbonate, mono-allyl dicarbonate, propyl allyl dicarbonate, mono-methyl dicarbonate, mono-ethyl dicarbonate, mono-propyl dicarbonate, mono-butyl dicarbonate, mono-benzyl dicarbonate, cyanomethyl methyl dicarbonate and nitromethyl methyl dicarbonate, and mixtures thereof.

3. The electrochemical cell of claim 1 wherein the dicarbonate additive is present in the electrolyte in a range of about 0.001M to about 0.40M.

4. The electrochemical cell of claim 1 wherein the dicarbonate additive is dibenzyl dicarbonate present in the electrolyte at a concentration up to about 0.20M.

5. The electrochemical cell of claim 1 wherein the activated anode and cathode provide the electrochemical cell dischargeable to deliver at least one current pulse of an electrical current of a greater amplitude than that of a prepulse current immediately prior to the pulse such that the pulse one end potential minus the pulse one minimum potential is less than about 0.1 volts.

6. The electrochemical cell of claim 5 wherein there are at least two pulses delivered in succession with or without an open circuit period between the pulses.

7. The electrochemical cell of claim 6 wherein the current pulses are of about 23.2 mA/cm$^2$.

8. The electrochemical cell of claim 1 wherein the alkali metal salt is selected from the group consisting of LiPF$_6$, LiBF$_4$, LiAsF$_6$, LiSbF$_6$, LiClO$_4$, LiAlCl$_4$, LiGaCl$_4$, LiC(SO$_2$CF$_3$)$_3$, LiN(SO$_2$CF$_3$)$_2$, LiSCN, LiO$_3$SCF$_2$CF$_3$, LiC$_6$F$_5$SO$_3$, LiO$_2$CCF$_3$, LiSO$_3$F, LiB(C$_6$H$_5$)$_4$ and LiCF$_3$SO$_3$, and mixtures thereof.

9. The electrochemical cell of claim 1 wherein the solid cathode is selected from the group consisting of silver vanadium oxide, copper silver vanadium oxide, manganese dioxide, cobalt oxide, nickel oxide, fluorinated carbon, copper oxide, copper sulfide, iron sulfide, iron disulfide, titanium disulfide and copper vanadium oxide, and mixtures thereof.

10. The electrochemical cell of claim 1 wherein the anode is comprised of lithium or a lithium-aluminum alloy.

11. The electrochemical cell of claim 1 wherein the cathode comprises from about 80 to about 99 weight percent of the cathode active material.

12. The electrochemical cell of claim 1 wherein the cathode further comprises a binder material and a conductive additive.

13. The electrochemical cell of claim 12 wherein the binder material is a fluoro-resin powder.

14. The electrochemical cell of claim 12 wherein the conductive additive is selected from the group consisting of carbon, graphite powder and acetylene black and metallic powder selected from the group consisting of titanium, aluminum, nickel and stainless steel, and mixtures thereof.

15. The electrochemical cell of claim 1 wherein the cathode comprises from about 0 to 3 weight percent carbon, about 1 to 5 weight percent of a powder fluoro-resin and about 94 weight percent of the cathode active material.

16. The electrochemical cell of claim 1 associated with an implantable medical device powered by the cell.

17. The electrochemical cell of claim 1 wherein the electrolyte includes a first solvent selected from the group consisting of an ester, an ether and a dialkyl carbonate, and mixtures thereof.

18. The electrochemical cell of claim 1 wherein the electrolyte includes a second solvent selected from the group consisting of a cyclic carbonate, a cyclic ester and a cyclic amide, and mixtures thereof.

19. The electrochemical cell of claim 17 wherein the first solvent is selected from the group consisting of tetrahydrofuran, methyl acetate, diglyme, triglyme, tetraglyme, 1,2-dimethoxyethane, 1,2-diethoxyethane, 1-ethoxy, 2-methoxyethane, dimethyl carbonate, diethyl carbonate, dipropyl carbonate, ethyl methyl carbonate, methyl propyl carbonate and ethyl propyl carbonate, and mixtures thereof.

20. The electrochemical cell of claim 18 wherein the second solvent is selected from the group consisting of propylene carbonate, ethylene carbonate, butylene carbonate, acetonitrile, dimethyl sulfoxide, dimethyl formamide, dimethyl acetamide, γ-butyrolactone and N-methyl-pyrrolidinone, and mixtures thereof.

21. In combination with an implantable medical device requiring at least one current pulse for a medical device operating function, an electrochemical cell which is dischargeable to deliver the current pulse while exhibiting reduced voltage delay, the cell which comprises:
    a) an anode comprising an alkali metal;
    b) a solid cathode of electrically conductive material; and
    c) a nonaqueous electrolyte activating the anode and the cathode, the nonaqueous electrolyte comprising:
        i) a first solvent selected from the group consisting of an ester, an ether and a dialkyl carbonate, and mixtures thereof;
        ii) a second solvent selected from the group consisting of a cyclic carbonate, a cyclic ester and a cyclic amide, and mixtures thereof;
        iii) a dicarbonate additive having the general formula: $(R^1O)C(=O)OC(=O)(OR^2)$, wherein $R^1$ and $R^2$ are the same or different and they can both be a hydrogen atom or one of $R^1$ and $R^2$ is a saturated or unsaturated organic group if the other of $R^1$ and $R^2$ is H or an unsaturated organic group and wherein when any one of $R^1$ and $R^2$ is an unsaturated organic group, the unsaturated organic group contains 2 to 13 carbon atoms and has the structure $(R^3)$ $(R^4)$ $(R^5)C-$ with at least $R^3$ being an aromatic substituent or an unsaturated organic or inorganic group and $R^4$ and $R^5$ being a hydrogen atom or a saturated or unsaturated hydrocarbon or heteroatom group and wherein when $R^1$ and $R^2$ are the same they cannot be both saturated organic groups; and
        iv) an alkali metal salt dissolved therein, wherein the activated anode and cathode provide the electrochemical cell dischargeable to deliver at least one current pulse for the medical device operating function, and wherein the current pulse is of an electrical current of a greater amplitude than that of a prepulse current immediately prior to the pulse such that the pulse one end potential minus the pulse one minimum potential is less than about 0.1 volts.

22. The combination of claim 21 wherein the dicarbonate additive is selected from the group consisting of dibenzyl dicarbonate, diallyl dicarbonate, methyl benzyl dicarbonate, ethyl benzyl dicarbonate, propyl benzyl dicarbonate, butyl benzyl dicarbonate, methyl allyl dicarbonate, ethyl allyl dicarbonate, mono-allyl dicarbonate, propyl allyl dicarbonate, mono-methyl dicarbonate, mono-ethyl dicarbonate, mono-propyl dicarbonate, mono-butyl dicarbonate, mono-benzyl dicarbonate, cyanomethyl methyl dicarbonate and nitromethyl methyl dicarbonate, and mixtures thereof.

23. The combination of claim 21 wherein the dicarbonate additive is present in the electrolyte in a range of about 0.001M to about 0.40M.

24. The combination of claim 21 wherein there are at least two pulses delivered in succession with or without an open circuit period between the pulses.

25. A method for providing an electrochemical cell activated with a nonaqueous electrolyte, comprising the steps of:
    a) providing an anode comprising an alkali metal;
    b) providing a solid cathode of electrically conductive material; and
    c) activating the electrochemical cell with the nonaqueous electrolyte operatively associated with the anode and the cathode, the nonaqueous electrolyte comprising:
        i) a first solvent selected from the group consisting of an ester, an ether and a dialkyl carbonate, and mixtures thereof;
        ii) a second solvent selected from the group consisting of a cyclic carbonate, a cyclic ester and a cyclic amide, and mixtures thereof;
        iii) a dicarbonate additive having the general formula: $(R^1O)C(=O)OC(=O)(OR^2)$, wherein $R^1$ and $R^2$ are the same or different and they can both be a hydrogen atom or one of $R^1$ and $R^2$ is a saturated or unsaturated organic group if the other of $R^1$ and $R^2$ is H or an unsaturated organic group and wherein when any one of $R^1$ and $R^2$ is an unsaturated organic group, the unsaturated organic group contains 2 to 13 carbon atoms and has the structure $(R^3)$ $(R^4)$ $(R^5)C-$ with at least $R^3$ being an aromatic substituent or an unsaturated organic or inorganic group and $R^4$ and $R^5$ being a hydrogen atom or a saturated or unsaturated hydrocarbon or heteroatom group and wherein when $R^1$ and $R^2$ are the same they cannot be both saturated organic groups; and
        iv) an alkali metal salt dissolved therein.

26. The method of claim 25 including selecting the dicarbonate additive from the group consisting of dibenzyl dicarbonate, diallyl dicarbonate, methyl benzyl dicarbonate, ethyl benzyl dicarbonate, propyl benzyl dicarbonate, butyl benzyl dicarbonate, methyl allyl dicarbonate, ethyl allyl dicarbonate, mono-allyl dicarbonate, propyl allyl dicarbonate, mono-methyl dicarbonate, mono-ethyl dicarbonate, mono-propyl dicarbonate, mono-butyl dicarbonate, mono-benzyl dicarbonate, cyanomethyl methyl dicarbonate and nitromethyl methyl dicarbonate, and mixtures thereof.

27. The method of claim 25 wherein the dicarbonate additive is present in the electrolyte in a range of about 0.001M to about 0.40M.

28. The method of claim 25 wherein the dicarbonate additive is dibenzyl dicarbonate present in the electrolyte at a concentration up to about 0.20M.

29. The method of claim 25 including discharging the cell to deliver at least one current pulse of an electrical current of a greater amplitude than that of a prepulse current immediately prior to the pulse such that the pulse one end potential minus the pulse one minimum potential is less than about 0.1 volts.

30. The method of claim 29 including discharging the cell to deliver at least two current pulses in succession with or without an open circuit period between the pulses.

31. The method of claim 29 wherein the current pulses are of about 23.2 mA/cm$^2$.

32. The method of claim 25 including selecting the first solvent from the group consisting of tetrahydrofuran, methyl acetate, diglyme, triglyme, tetraglyme, 1,2-dimethoxyethane, 1,2-diethoxyethane, 1-ethoxy,2-methoxyethane, dimethyl carbonate, diethyl carbonate, dipropyl carbonate, ethyl methyl carbonate, methyl propyl carbonate and ethyl propyl carbonate, and mixtures thereof.

33. The method of claim 25 including selecting the second solvent from the group consisting of propylene carbonate, ethylene carbonate, butylene carbonate, acetonitrile, dimethyl sulfoxide, dimethyl formamide, dimethyl acetamide, γ-butyrolactone and N-methyl-pyrrolidinone, and mixtures thereof.

34. The method of claim 25 including selecting the alkali metal salt from the group consisting of $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)_4$ and $LiCF_3SO_3$, and mixtures thereof.

35. The method of claim 25 including selecting the solid cathode from the group consisting of silver vanadium oxide, copper silver vanadium oxide, manganese dioxide, cobalt oxide, nickel oxide, fluorinated carbon, copper oxide, copper sulfide, iron sulfide, iron disulfide, titanium disulfide and copper vanadium oxide, and mixtures thereof.

36. The method of claim 25 including providing the anode comprised of lithium or a lithium-aluminum alloy.

37. The method of claim 25 including providing the cathode comprising from about 80 to about 99 weight percent of the cathode active material.

38. The method of claim 25 including providing the cathode further comprising a binder material and a conductive additive.

39. The method of claim 38 wherein the binder material is a fluoro-resin powder.

40. The method of claim 38 including selecting the conductive additive from the group consisting of carbon, graphite powder and acetylene black and metallic powder selected from the group consisting of titanium, aluminum, nickel and stainless steel, and mixtures thereof.

41. The method of claim 25 including providing the cathode comprising from about 0 to 3 weight percent carbon, about 1 to 5 weight percent of a powder fluoro-resin and about 94 weight percent of the cathode active material.

42. The method of claim 25 including powering an implantable medical device with the electrochemical cell.

43. An electrochemical cell, which comprises:
a) an anode comprising an alkali metal;
b) a solid cathode of electrically conductive material; and
c) a nonaqueous electrolyte activating the anode and the cathode, the nonaqueous electrolyte comprising:
i) a first solvent selected from the group consisting of an ester, an ether and a dialkyl carbonate, and mixtures thereof;
ii) a second solvent selected from the group consisting of a cyclic carbonate, a cyclic ester and a cyclic amide, and mixtures thereof;
iii) dibenzyl dicarbonate present in the electrolyte at a concentration up to about 0.20M; and
iv) an alkali metal salt dissolved therein.

44. A method for providing an electrochemical cell activated with a nonaqueous electrolyte, comprising the steps of:
a) providing an anode comprising an alkali metal;
b) providing a solid cathode of electrically conductive material; and
c) activating the electrochemical cell with the nonaqueous electrolyte operatively associated with the anode and the cathode, the nonaqueous electrolyte comprising:
i) a first solvent selected from the group consisting of an ester, an ether and a dialkyl carbonate, and mixtures thereof;
ii) a second solvent selected from the group consisting of a cyclic carbonate, a cyclic ester and a cyclic amide, and mixtures thereof;
iii) dibenzyl dicarbonate present in the electrolyte at a concentration up to about 0.20M; and
iv) an alkali metal salt dissolved therein.

* * * * *

UNITED STATES PATENT AND TRADEMARK OFFICE
CERTIFICATE OF CORRECTION

PATENT NO. : 6,063,526
DATED : May 16, 2000
INVENTOR(S) : Gan et al.

It is certified that error appears in the above-identified patent and that said Letters Patent is hereby corrected as shown below:

Title page,
    item [75] Inventors: "Takuchi" should be --Takeuchi--.

Signed and Sealed this

Twenty-second Day of May, 2001

*Attest:*

NICHOLAS P. GODICI

*Attesting Officer*     Acting Director of the United States Patent and Trademark Office